United States Patent [19]

Wilson

[11] Patent Number: 4,643,538

[45] Date of Patent: Feb. 17, 1987

[54] COMBINED BEAM CROSS-SECTION CORRECTING, COLLIMATING AND DE-ASTIGMATIZING OPTICAL SYSTEM

[75] Inventor: Scott D. Wilson, Adams County, Colo.

[73] Assignee: Storage Technology Partners II, Louisville, Colo.

[21] Appl. No.: 628,691

[22] Filed: Jul. 6, 1984

[51] Int. Cl.$^4$ ............................................. G02B 5/04
[52] U.S. Cl. ...................................... 350/421; 350/286
[58] Field of Search ............................... 350/421, 286

[56] References Cited

U.S. PATENT DOCUMENTS

| | | | |
|---|---|---|---|
| T953,002 | 12/1976 | Firester | 178/66 R |
| 3,973,317 | 9/1976 | Glorioso | 178/6.6 R |
| 4,085,423 | 4/1978 | Tsunoda et al. | 358/128 |
| 4,115,809 | 9/1978 | Uenu | 358/128 |
| 4,128,308 | 12/1978 | McNaney | 350/286 |
| 4,198,701 | 4/1980 | Reddersen et al. | 365/127 |
| 4,203,652 | 5/1980 | Hanada | 350/421 |
| 4,321,839 | 3/1982 | Yamashita et al. | 369/122 |
| 4,333,173 | 6/1982 | Yonezawa et al. | 369/45 |
| 4,337,535 | 6/1982 | Van Megen | 369/121 |
| 4,361,383 | 11/1982 | McMahan, Jr. | 350/162-12 |
| 4,580,879 | 4/1986 | Wilson | 350/421 |

*Primary Examiner*—John K. Corbin
*Assistant Examiner*—Rebecca D. Gass

*Attorney, Agent, or Firm*—Woodcock Washburn Kurtz Mackiewicz & Norris

[57] ABSTRACT

A combined collimating, cross-section correcting and de-astigmatizing lens system for providing laser beams which, are fully collimated, de-astigmatized, and have a circular cross-section of the proper diameter. In the preferred embodiment a first compound spherical lens system partially collimates the beam so that the in-line combined cross-section corrector/de-astigmatizer system can properly de-astigmatize the beam. The beam cross-section corrector/de-astigmatizer is comprised of first and second triangular prisms oriented at non-normal angles to the path of the beam. This allows both the cross-section and the astigmatism of the beam to be corrected. A planar mirror between the first and second prisms directs the beam from the first prism to the second prism, so that the beam can exit the second prism co-axial with the incident beam path. The beam then enters the second collimating subsystem, which also acts as a telescopic lens system, and simultaneously completely collimates the beam and expands it to the proper diameter for transmission through the optical system of the main device. The beam, upon exiting is fully collimated beam of the proper power output, is de-astigmatized and has a circular cross-section of the proper diameter.

6 Claims, 4 Drawing Figures

COMBINED BEAM CROSS-SECTION CORRECTING, COLLIMATING AND DE-ASTIGMATIZING OPTICAL SYSTEM

BACKGROUND OF THE INVENTION

The disclosed invention relates to the field of coherent light transmission devices, and in particular, to the correction of the beam profiles of the light beam emitted by semi-conductor lasers.

In high speed random access optical recording systems, it is well known to use a modulated and focused radiation beam, usually a laser, to record both digital and analog information on a recording surface. In recent years, there has been increased interest in the development of optical storage devices which can record as well as read optical information. See e.g. U.S. Pat. No. 4,363,116, issued Dec. 7, 1982, to Kleuters et al., wherein a single laser is used to both record data on, and to read data from, the disk surface. In Kleuters, this dual purpose is accomplished by switching the laser from a higher intensity write beam to a lower intensity read beam. There has also been increased interest in the use of multi-laser systems for both reading and writing. See U.S. Pat. No, 4,198,701, issued Apr. 15, 1980, to Reddersen et al., wherein a first beam is used for writing data, and a second beam is used for reading data. See also U.S. Pat. No. 4,334,299, issued June 8, 1982, to Komurasaki et al.

In the early optical recording devices, gas lasers were used to read and write data. However, the power output of semiconductor lasers has increased and sustained performance has become more reliable. See U.S. Pat. No. 4,360,920, issued Nov. 23, 1982 to Woda et al.; and U.S. Pat. No. 4,360,919, issued Nov. 23, 1982, to Fijiwara et al. As a result, diode lasers have begun to be used in optical recording devices to read and, more recently, to write user data. See for example U.S. Pat. No. 4,345,321, issued Aug. 17, 1982 to Arquie et al. However, the performance characteristics of diode lasers still vary widely from individual laser to individual laser. Accordingly, where standardized output for reading or writing is required, it has been necessary to custom design the optics in the device according to the specific output characteristics of the individual laser diode mounted in the device. See U.S. Pat. No. 4,322,838, issued Mar. 30, 1982, to Neumann, disclosing a collimating system; U.S. Pat. No. 4,333,173, issued to Yonezawa et al., and; U.S. Pat. No, 4,128,308, issued Dec. 5, 1978 to McNaney.

Diode lasers emit beams which are uncollimated, have non-circular cross-sections, and have astigmatic focal points. In addition, the power output varies significantly from laser to laser. Therefore, for the laser to be used in most applications and in particular in optical storage and retrieval devices where diffraction limited spot sizes are desired, the output profile of the beam must be standardized. Specifically, the cross-section of the beam must be circularized, the beam must be collimated, and the original astigmatism must be corrected. Complex lens systems have been developed which can separately correct for astigmatism, un-collimation, and a non-circular beam cross-section. To date, these systems have been rather bulky and most difficult to adjust due to the complex number of elements required. What is needed then is a simpler, more efficient, means of circularizing and de-astigmatizing the incident beam. The present invention provides just such a means.

It is an object of this invention to provide a means for efficiently circularizing a diode laser beam having a non-circular cross-section.

It is another object of the disclosed invention to provide a means for efficiently de-astigmatizing the astigmatic laser beam emitted by diode lasers.

It is still another object of the disclosed invention to provide a means for efficiently collimating the divergent laser beam emitted by diode lasers.

It is yet another object of the disclosed invention to provide a means for the in-line circularization of an un-circularized laser beam emitted by diode lasers.

It is still yet another object of the disclosed invention to provide a means for the in-line de-astigmatizatin of an astigmatic laser beam emitted by diode lasers.

It is yet still another object of the disclosed invention to provide a single combined means for the in-line, cross-section correction and de-astigmatization of the incident laser beam emitted by diode lasers.

BRIEF SUMMARY OF THE INVENTION

The present invention discloses a combined beam cross-section correction, collimating and de-astigmatizing lens sytem which produces collimated, circularized and de-astigmatized light beams from diode laser light sources having widely varying output characteristics. The light beam emitted by the diode laser is usually a divergent, astigmatic beam, having an elliptical cross-section. For the beam to be properly used in an optical read/write device wherein diffraction limited spot sizes are desirable, the beam must be collimated, de-astigmatized, and corrected to a circular cross-section.

In the preferred embodiment of the disclosed invention, the combined system is comprised of: the first collimating subsystem, which partially collimates the incident beam; a combined beam cross-section correcting/de-astigmatizer subsystem, and; a second collimating subsystem, which completely collimates the beam.

In operation, the beam is incident upon the first collimating subsystem. In the preferred embodiment the first collimating subsystem is a first compound spherical lens. This first compound spherical lens collects and partially collimates the beam.

Upon exiting the first collimating subsystem, the beam enters the combined beam cross-section correcting/de-astigmatizing lens system. This lens system is comprised of a first triangular shaped prism, a planar reflecting mirror, and a second triangular shaped prism. The first and second prisms are oriented such that the beam is incident upon the entrance surfaces of the first and second prisms at non-normal angles. By entering the prism at a non-normal angle, the minor axis of the beam is expanded. The major axis remains unchanged. The cross section profile of the beam is thereby modified. The first and second prisms are selected and oriented relative to the axis of the beam and to each other such that upon exiting the second prism, the beam and to each other such that upon exiting the second prism, the beam is completely circularized.

In this preferred embodiment, the combined lens system is also advantageously used to de-astigmatize the beam. When a slightly uncollimated coherent light beam enters a planar refractive surface at a non-normal angle, astigmatism is introduced into the beam. By properly selecting and positioning the prisms, this astigmatizing characteristic of the prisms is used to "correct", or de-astigmatize, the initial astigmatism produced by the diode laser.

Thus, a de-astigmatized and circularized beam exits the prisms and enters the second collimating subsystem where the beam can then be fully collimated. In the preferred embodiment, the second collimating subsystem is comprised of a second and a third spherical lens, and is positioned to receive the de-astigmatized, circularly cross-sectioned beam. It can therefore be seen why the collimation system is split into two separate subsystems. The beam must be slightly uncollimated in order to take advantage of the astigmatism correcting features of the prisms.

In the preferred embodiment, the second and third lens can also act as a telescope to expand the beam to the diameter specified for use in the remainder of a device optical system.

DETAILED DESCRIPTION OF THE PREFERRED EMBODIMENT

Figure 1:
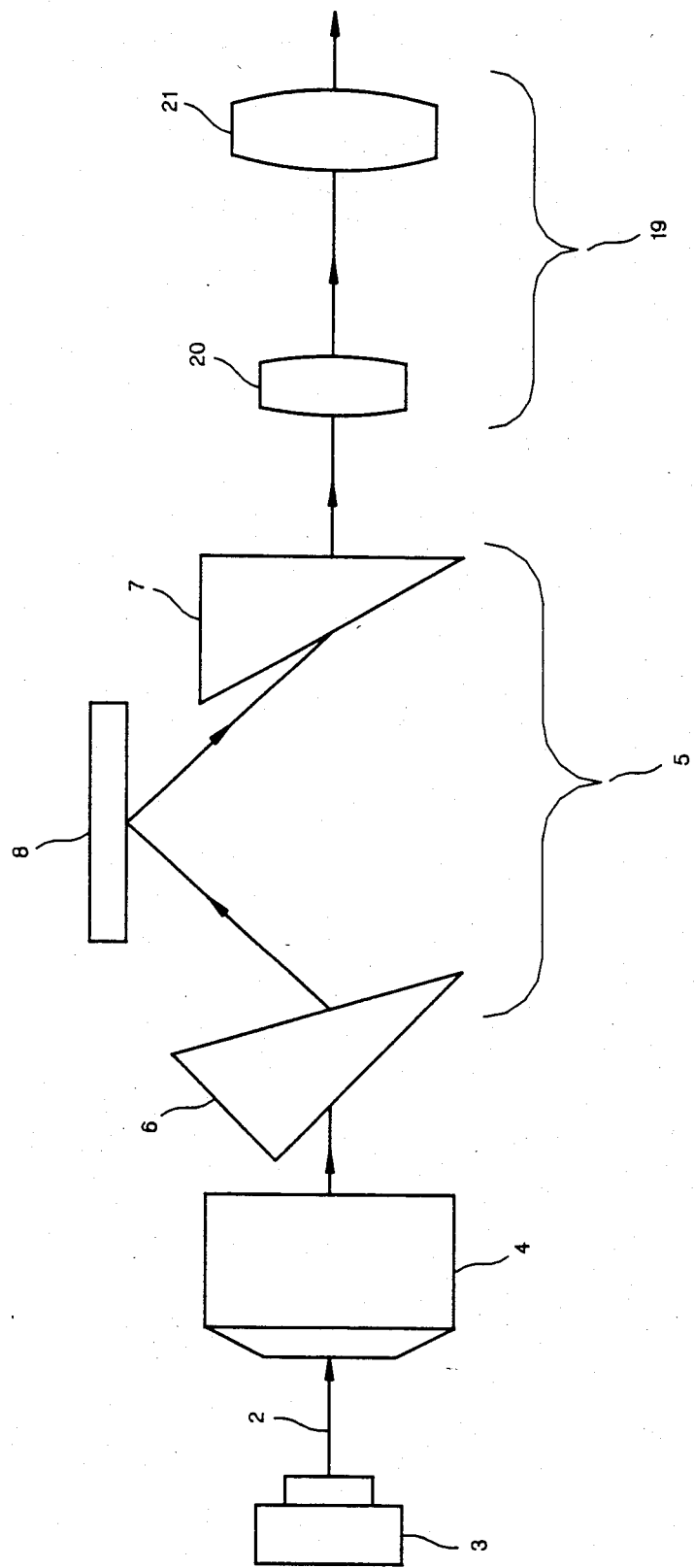
FIG. 1 is a pictoral representation showing the optical elements of the disclosed invention.

As shown in FIG. 1, in the preferred embodiment of the disclosed invention, a combined beam cross-section correcting, collimating and de-astigmatizing lens system, the beam 2 emitted by a diode laser 3 passes through the first collimating subsystem 4, which in the preferred embodiment is a first compound spherical lens (not shown). The first collimating subsystem 4 partially collimates the laser beam 2, and also serves to collect the light emitted by the laser diode 3. As will be discussed below, for efficient operation of the preferred embodiment, collimating subsystem 4 by design only partially collimates the beam 2.

After passing through the first collimating subsystem 4, the beam 2 is incident upon the combined prism beam cross-section correcting/de-astigmatizing lens system 5. In the preferred embodiment, this combined prism beam cross-section correcting/de-astigmatizing lens system 5 is comprised of a first triangular prism 6, a second triangular prism 7, and a planar mirror 8. The prism combined lens system 5 serves two purposes; to circularize and to de-astigmatize the astigmatic and elliptically cross-section shaped beam 2.

Figure 2A:
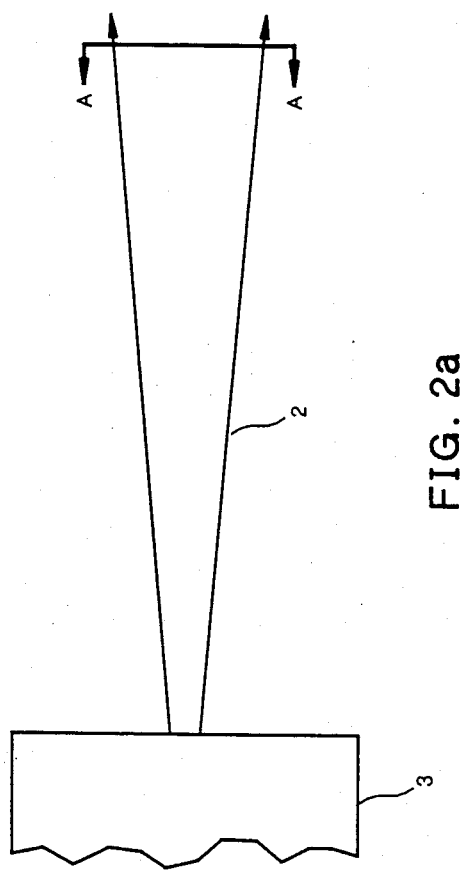
FIG. 2a is a representational view of the end facet of the diode laser, showing a greatly exaggerated view of the diverging laser beam.
Figure 2B:
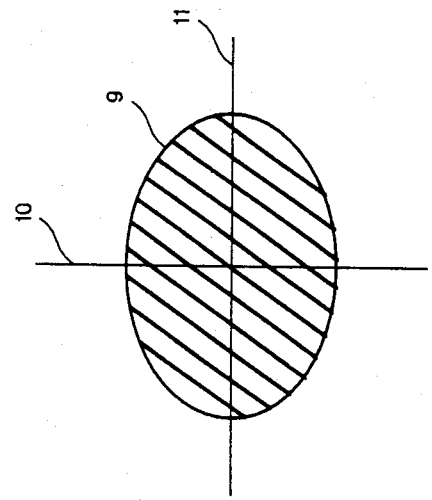
FIG. 2b is a cross-section A—A view of the laser beam shown in FIG. 2a, showing the elliptical shape of the beam emitted by the diode laser.

As shown in FIG. 2a, the diode laser 3 emits a beam 2 which, through coherent, is diverging, and as shown in FIG. 2b, has an elliptical cross-section 9. When the uncollimated light beam 2 is incident on a planar surface at a non-normal angle, its minor axis 10 is expanded, while its major axis 11 remains unchanged. To take advantage of this, the first and the second triangular shaped prisms 6 and 7 are oriented such that the incident beam 2 impinges the prism surfaces at non-normal angles, and with the prisms 6 and 7 positioned to provide for the complete circularization of the beam 2 upon exit from the second prism 7.

The preferred embodiment provides for the in-line expansion of the beam 2. Each prism 6 and 7 provides approximately one-half of the circularization needed, with the planar mirror 8 placed between the first and the second prism 6 and 7 in order to reflect the beam 2 emerging from the first prism 6 onto the second prism 7, in order to retain the in-line alignment. Upon emerging from the second prism 7, the incident beam 2 has a circular cross-section. For more detail on this aspect of this portion of the present invention, see co-pending U.S. patent application Ser. No. 529,425, filed Sept. 6, 1983, entitled "IN LINE ANAMORPHIC BEAM EXPANDER", issued Apr. 8, 1986 as U.S. Pat. No. 4,580,879, which is hereby incorporated by reference.

Figure 3:
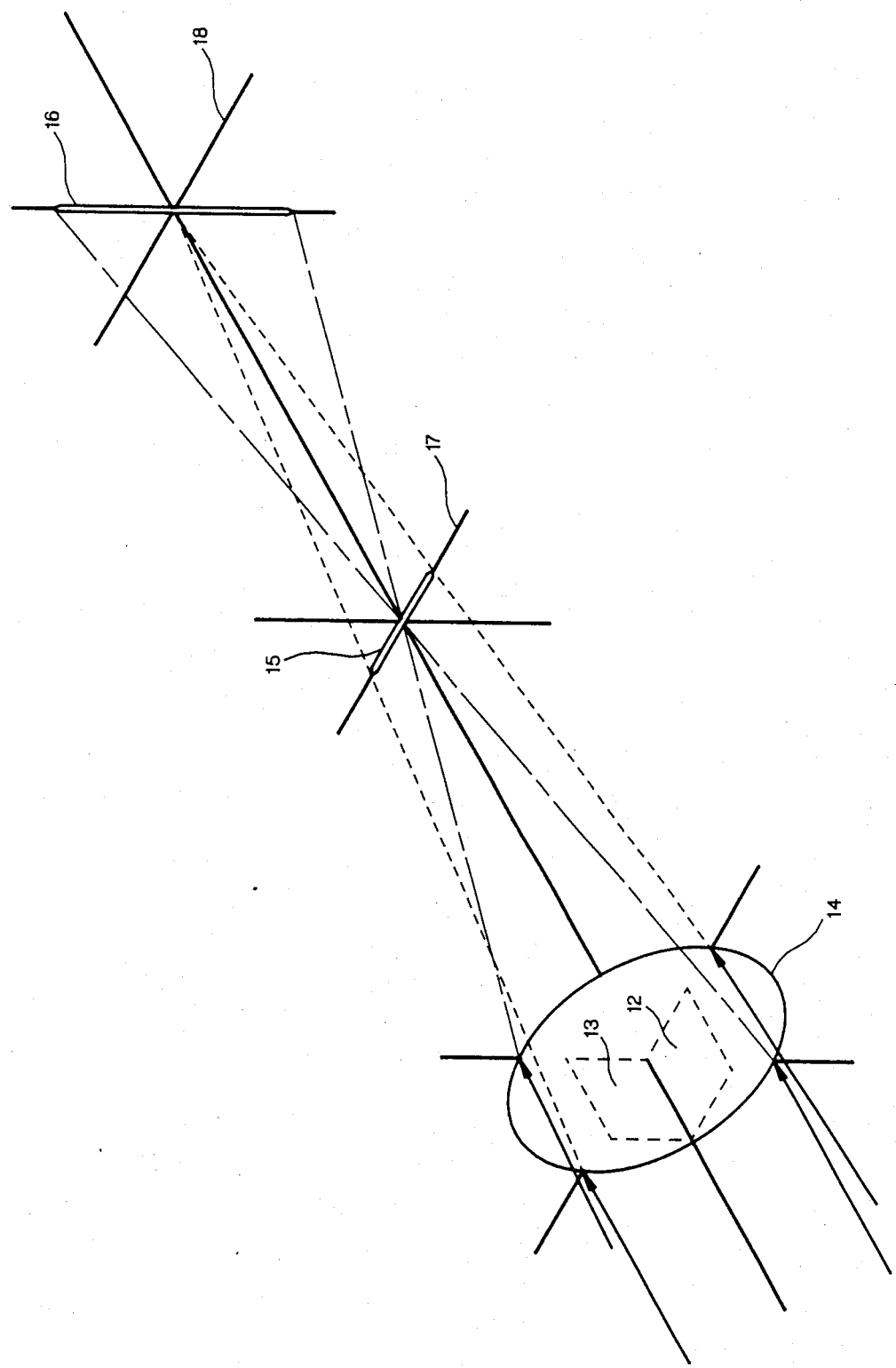
FIG. 3 is a perspective representation showing the astigmatic focus of the beam generated by the diode laser.

The incident beam 2 is also astigmatic, i.e., has two distinct focal points. As shown in FIG. 3, the first plane 12 and second plane 13 of example objective lens 14 provide a primary 15 and a secondary 16 image resulting in a line focus at the first and second focal planes 17 and 18. However, when an un-collimated beam passes through a planar surface at a non-normal angle, the effective focal length of one axis of the beam is altered. Generally, astigmatism introduced by this phenomenon has been viewed as a problem. However, the preferred embodiment advantageously makes use of this characteristic to correct the original astigmatism of the incident beam 2.

The first prism 6 of the combined prism beam cross-section correcting/de-astigmatizing system 5 receives the beam 2 from the first collimating subsystem 4 and is oriented to receive the incident beam 2 at a non-normal angle from the mirror 8. Since this effect can only be achieved with a partially collimated beam, it is essential that the first collimating system only partially collimate the beam 2.

Accordingly, by proper selection of the prism 6 and 7 shapes and angles of orientation, the astigmatism in the incident beam 2 can be corrected by the same system which circularized the beam 2. In a device where the path of the beam 2 after exit from the cross-section correcting/deastigmatizing system 5 is not critical, a single prism (not shown) may be used. However, in the preferred embodiment, the two prisms 6 and 7, each partially correct the astigmatism of the beam 2, and are used in conjunction with the planar mirror 8 to provide for the in-line de-astigmatization of the beam 2.

Upon emerging from the combined beam prism cross-section correcting/de-astigmatizing subsystem 5, the now circularized and de-astigmatized beam 2 must be fully collimated. The second collimating subsystem 19 does this. In the preferred embodiment, the second collimating subsystem 19 is comprised of a second and a third spherical lens 20 and 21. This second collimating subsystem 19 also operates as the beam expanding (telescopic) lens system, to expand the now circular beam 2 diameter to that which may be necessary for use in a device optical system.

For convenience and permanent mounting, all elements can be fixedly attached to a base plate (not shown).

I claim:

1. A combined beam cross-section correcting, collimating and de-astigmatizing optical system for providing standardized and corrected output from a diode laser, said system comprised of:

a diode laser, said laser emitting a laser beam unit that is coherent, divergent, astigmatic, and that has a non-circular cross-section;

a first collimating subsystem, said first collimating subsystem collecting the laser beam incident thereto, said first collimating subsystem partially collimating the incident laser beam;

a combined beam cross-secton correcting de-astigmatizing subsystem comprising means for expanding the major and minor axis of the laser beam incident beams so as to circularize the cross-section thereof and for correcting the astigmatism of the laser beam emitted by the diode laser; and a second collimating subsystem, said second collimating subsystem receiving the partially collimated, de-astigmatized and circularized laser beam and further collimating the same.

2. The diode laser output correcting system as recited in claim 1, wherein the means for expanding so as to circularize the incident elliptical cross-sectional beam is comprised of:

a prism, said prism positioned in the path of the incident laser beam and oriented such that the minor axis diameter of the incident beam is fully expanded to match the major axis of the beam.

3. The diode laser output correcting system as recited in claim 1, wherein the first collimating subsystem is comprised of a single first compound spherical objective lens.

4. The diode laser output correcting system as recited in claim 3, wherein the second collimating subsystem is comprised of:

a second spherical lens, and;

a third spherical lens, the second spherical lens positioned to receive the beam from the first spherical lens.

5. A combined beam cross-section correcting, collimating and de-astigmatizing optical system for providing standardized and corrected output from a diode laser, said system comprised of:

a diode laser, said laser emitting a laser beam unit that is coherent, divergent, astigmatic, and that has a non-circular cross-section;

a first collimating subsystem, said first collimating subsystem collecting the laser beam incident thereto, said first collimating subsystem partially collimating the incident laser beam;

a second collimating subsystem, said second collimating subsystem receiving the partially collimated laser beam and further collimating the same;

means for correcting the astigmatism of the laser beam emitted by the diode laser, and;

means for expanding the major and minor axis of the laser beam incident beams so as to circularize the cross-section thereof, wherein the means for expanding so as to circularize the elliptical cross-section is comprised of an in-line prism beam cross-section correcting system, said last-named system comprised of:

a first prism, said prism positioned and oriented to receive the incident elliptical cross-sectioned beam and partially circularize said beam;

a second prism, said prism positioned and oriented to receive the partially circularized beam from the second prism, and fully circularize the beam, and;

a planar mirror, positioned between the first and the second prism so as to receive the beam exiting first prism and reflect the beam into the second prism, the configuration and position of the prisms oriented such that the path of the beam upon exiting the second prism is co-axial with the path of the beam incident upon the first prism.

6. The diode laser output correcting system as recited in claim 5 wherein the means for expanding further comprises the means for correcting the astigmatism of the incident beam, such that upon the beam passing through the first and second prisms at a non-normal angle, a focus point shift is introduced into the beam, by the first and second prisms which corrects the astigmatism in the beam when emitted by the diode laser.

* * * * *